Figure 1:
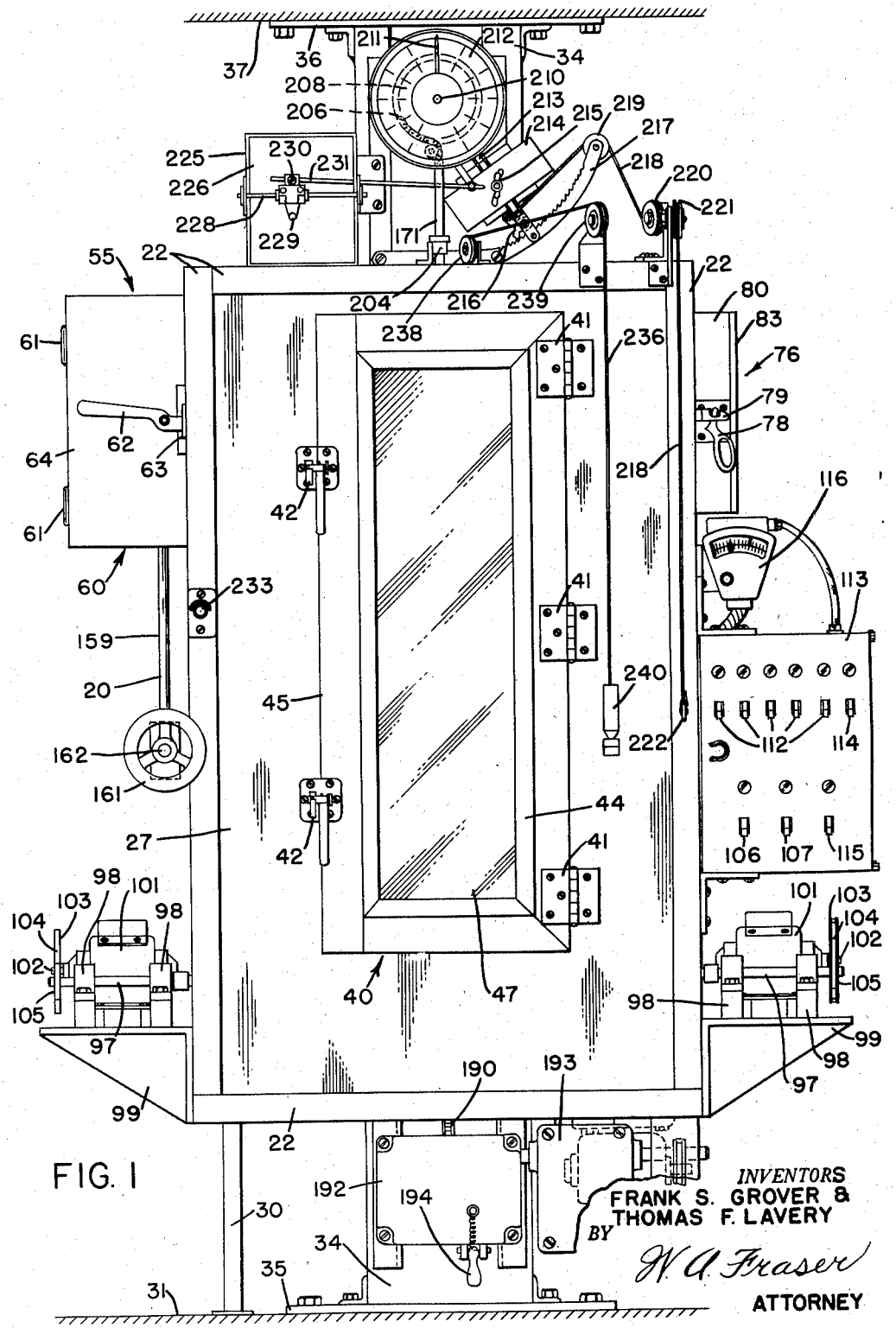

INVENTORS
FRANK S. GROVER &
THOMAS F. LAVERY
BY W. A. Fraser
ATTORNEY

Sept. 22, 1959   F. S. GROVER ET AL   2,904,993
APPARATUS FOR TESTING NATURAL AND SYNTHETIC
RUBBERS AT HIGH TEMPERATURES
Filed Feb. 11, 1957   7 Sheets-Sheet 2

INVENTORS
FRANK S. GROVER &
THOMAS F. LAVERY
BY
W. A. Fraser
ATTORNEY

Sept. 22, 1959     F. S. GROVER ET AL     2,904,993
APPARATUS FOR TESTING NATURAL AND SYNTHETIC
RUBBERS AT HIGH TEMPERATURES
Filed Feb. 11, 1957     7 Sheets-Sheet 3

INVENTORS
FRANK S. GROVER &
THOMAS F. LAVERY
BY
*W. A. Fraser*
ATTORNEY

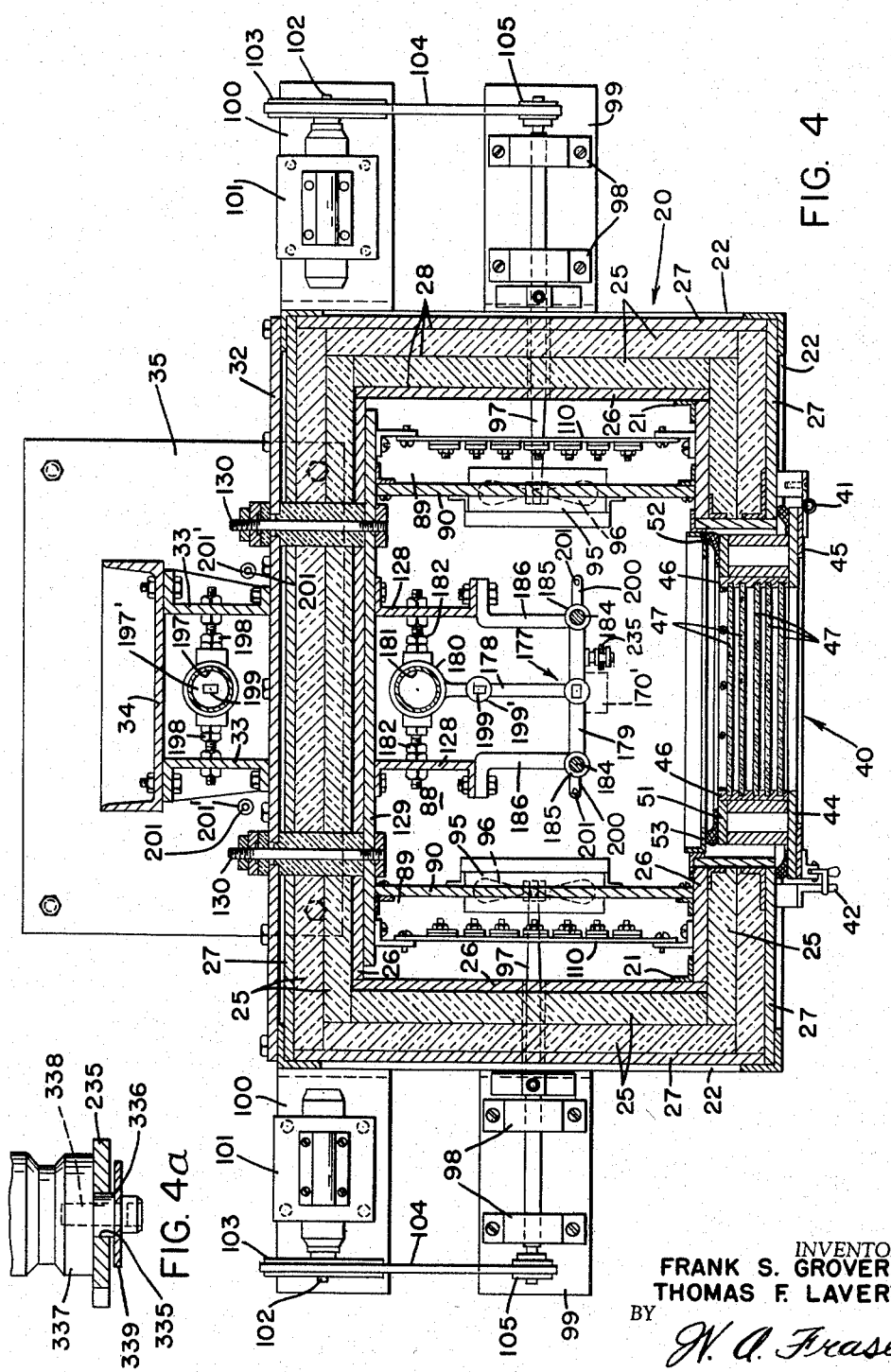

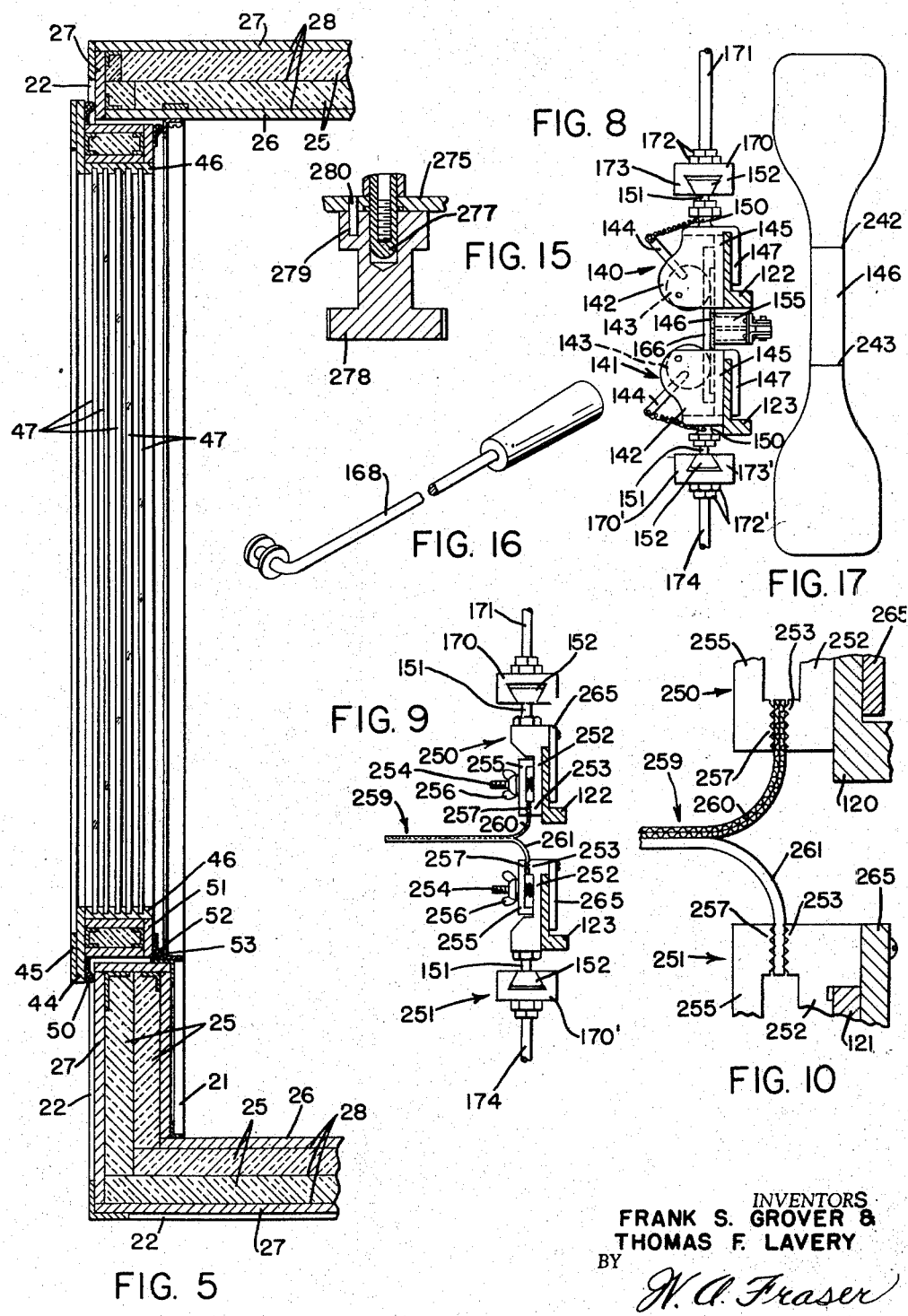

INVENTORS
FRANK S. GROVER &
THOMAS F. LAVERY
BY
W. A. Fraser
ATTORNEY

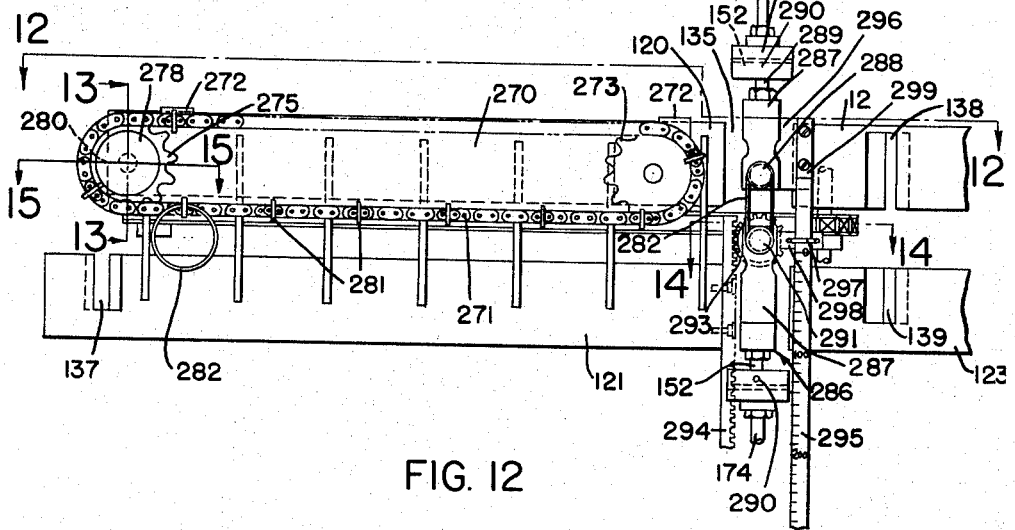
FIG. 11
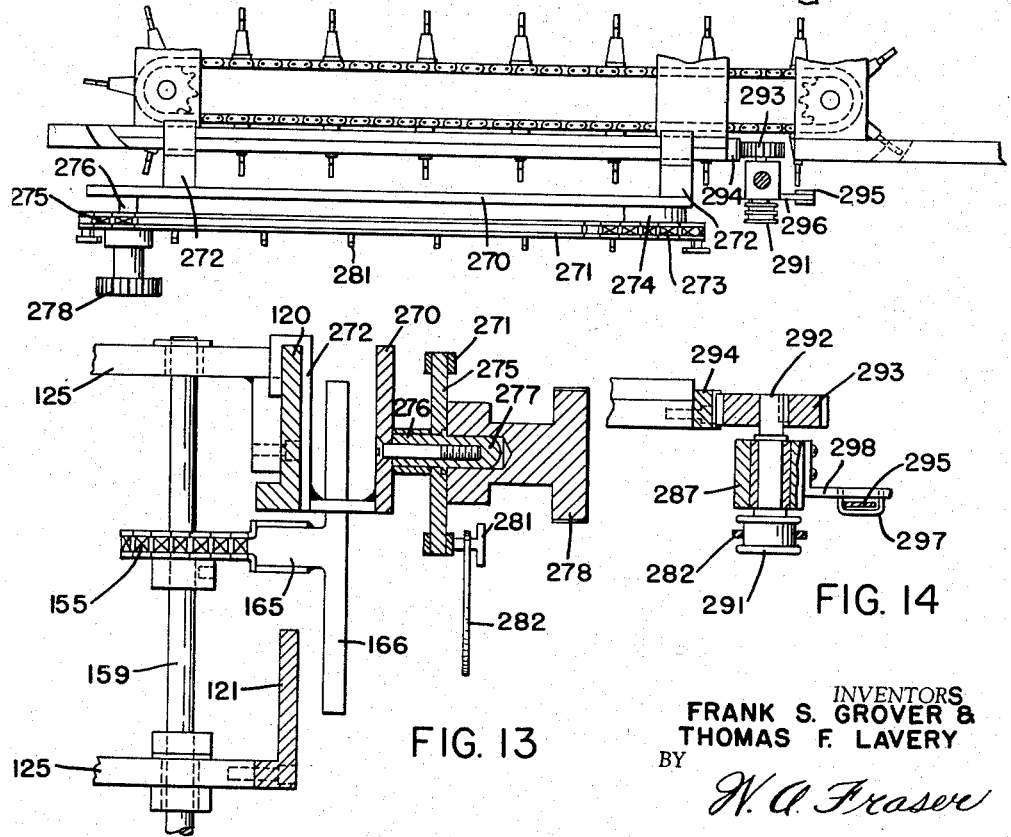
FIG. 12
FIG. 13
FIG. 14
INVENTORS
FRANK S. GROVER &
THOMAS F. LAVERY
BY
W. A. Fraser
ATTORNEY United States Patent Office 2,904,993
Patented Sept. 22, 1959

2,904,993

APPARATUS FOR TESTING NATURAL AND SYNTHETIC RUBBERS AT HIGH TEMPERATURES

Frank S. Grover, Cuyahoga Falls, and Thomas F. Lavery, Akron, Ohio, assignors to The Firestone Tire & Rubber Company, Akron, Ohio, a corporation of Ohio Application February 11, 1957, Serial No. 639,524

11 Claims. (Cl. 73—15.6)

This invention relates to an apparatus for testing and measuring the tensile, elongation, tear and adhesion properties of elastomers, more particularly natural and synthetic rubbers, at elevated temperatures.

Performance requirements for rubber products used in the automotive and aircraft fields are increasing rapidly. For example, the Air Force now requires rubber products capable of service from about −80° to +500° F., and a future need for rubber materials serviceable at temperatures as high as 1000° F. is envisioned. In order for the producers of these rubber products to be certain that their products are capable of service over the temperature range required, and particularly at the higher temperatures, substantial preliminary tests must be made of the materials to be used. Attempts have been made to provide apparatus for testing these materials at high temperatures, but none has been entirely satisfactory.

One of the objects of this invention is to provide a testing apparatus which will permit physical test data to be obtained over the temperature range from room temperature to about 650° F., and higher, under proper control.

Another object is to provide a testing apparatus that includes a heavily insulated compartment having a bank of heaters on each side, with provision being made for circulation of air downward past the heaters and then upward through the test zone.

A further object is to provide an insulated testing compartment which may be heated to high temperatures and which has relatively small entrance and exist doors at opposite sides of the compartment, where introduction and removal of test samples takes place, without the necessity of opening a large main door with consequent substantial loss of heat through the latter door. This arrangement mitigates against any substantial loss of heat through the side doors and permits physical testing to be conducted within a very narrow temperature range at the desired test temperature, while eliminating the lengthy delays which are necessary with main-door loading type equipment in order to allow the test chamber to heat up again to the desired operating temperature.

A further object is to provide an insulated testing compartment wherein a novel trackway arrangement is provided for carrying clamps holding test samples from the entrance door to the test region, and thereafter to the exit door.

A further object is to provide novel means for moving the clamps and test samples from the entrance door to the test region.

A further object is to provide a novel guiding and centering means for the clamps carrying the test samples when they reach the test region.

A further object is to provide novel test sample carrying devices which comprise one type of clamp to be used when making tensile, elongation, and tear tests with "dumbbell" strip samples, and another type of clamp for use when making adhesion tests, while an extra attachment with non-clamping carrying devices is used when testing "O-ring" samples.

Other objects and advantages will become apparent from the following description taken in conjunction with the accompanying drawings.

Figure 2:
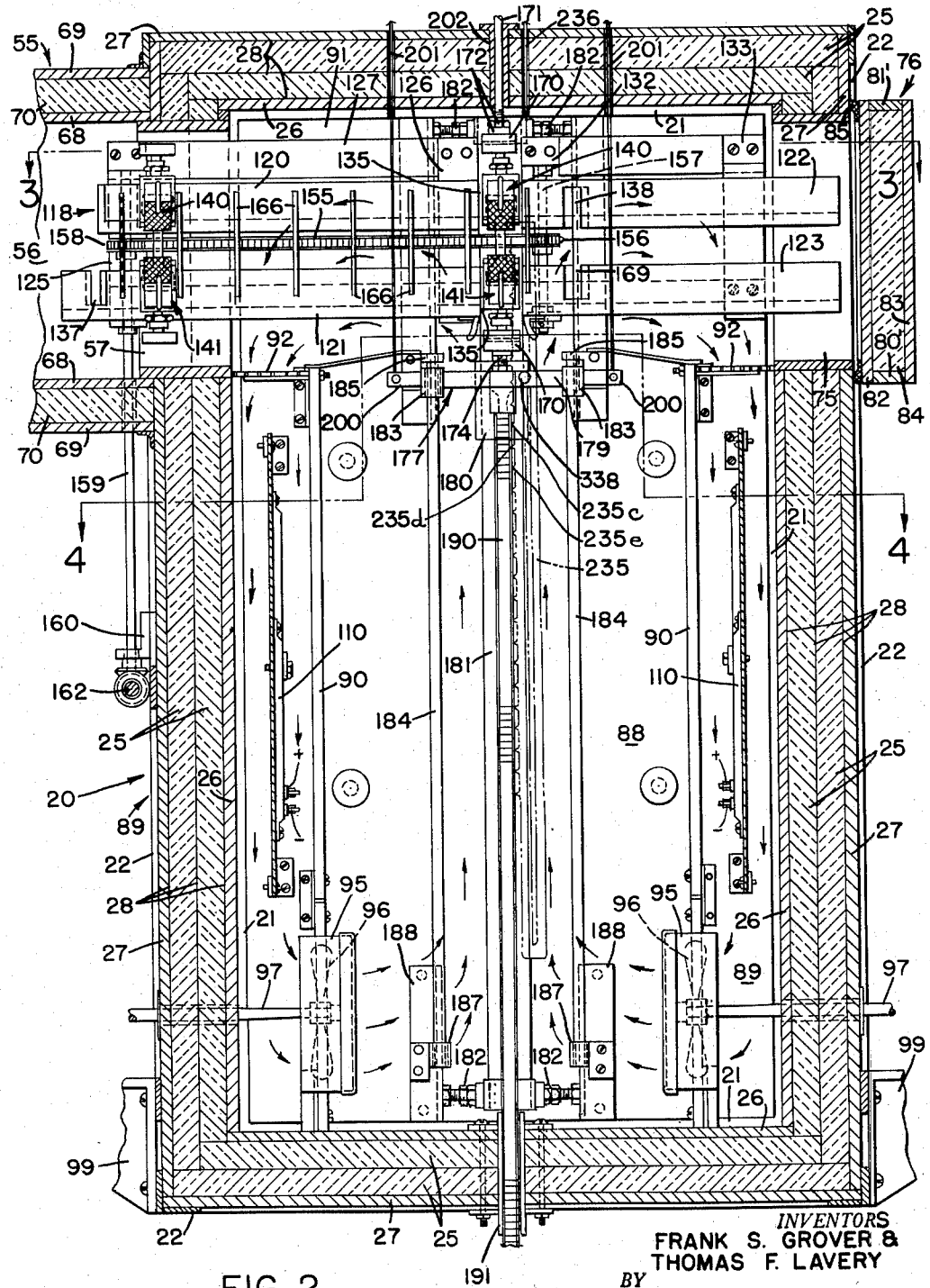
Figure 6:
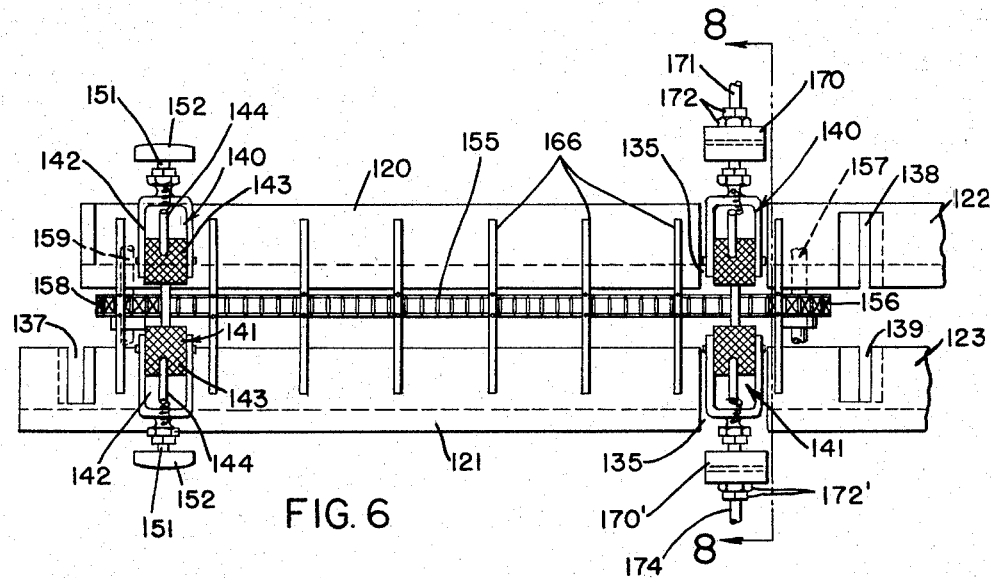
Figure 7:
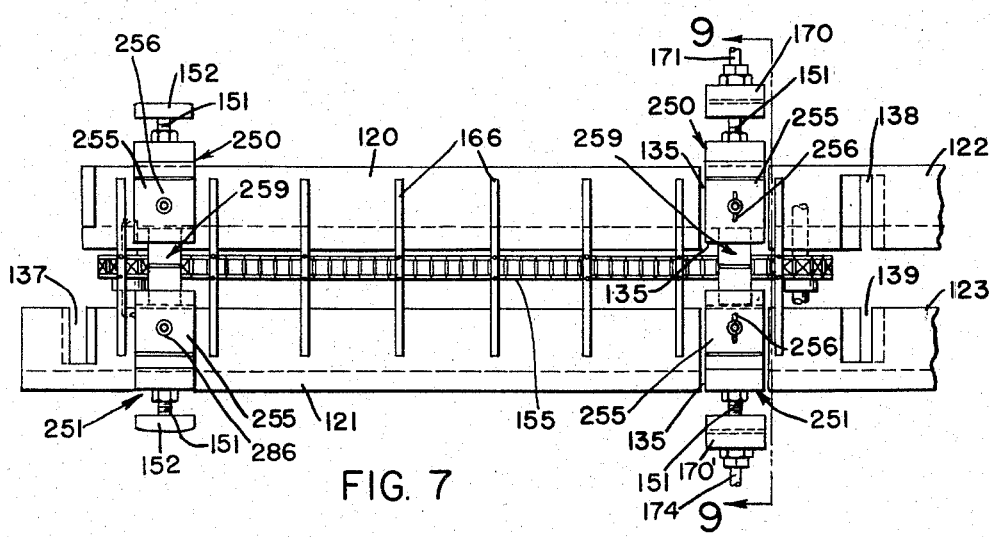

In the drawings:

Fig. 1 is a front elevation of the testing apparatus,

Fig. 2 is an enlarged vertical section taken substantially on line 2—2 of Fig. 3, with some parts being shown in elevation, Fig. 2a is an enlarged fragmentary view of the upper end of the tensile measuring scale, Fig. 3 is a horizontal section taken substantially on line 3—3 of Fig. 2, with the test clamps removed, Fig. 3a is an enlarged fragmentary section of an insulated wall of the heated compartment, Fig. 4 is a horizontal section taken substantially on line 4—4 of Fig. 2, Fig. 4a is an enlarged fragmentary view showing the measuring rod guiding mechanism, Fig. 5 is a fragmentary section taken substantially on line 5—5 of Fig. 3, Fig. 6 is an enlarged fragmentary view of the trackways and test region, with the type of clamp shown therein which is used with tensile, elongation and tear tests of "dumbbell" strip samples, Fig. 7 is a similar view with a modified type of clamp shown, which is used in making adhesion tests, Fig. 8 is a fragmentary section taken substantially on line 8—8 of Fig. 6, with some parts being shown in elevation, Fig. 9 is a similar section taken substantially on line 9—9 of Fig. 7, Fig. 10 is an enlarged fragmentary view of the gripping ends of the clamps used in making adhesion tests, with a test sample shown in position between the clamps, Fig. 11 is a view similar to Fig. 6 with a separate conveyor chain for "O-ring" samples to be conveyed to the test region, Fig. 12 is a plan view of the equipment shown in Fig. 11, taken substantially in the direction indicated by line 12—12 of Fig. 11, Fig. 13 is an enlarged fragmentary section taken substantially on line 13—13 of Fig. 11, Fig. 14 is a similar section taken substantially on line 14—14 of Fig. 11, Fig. 15 is a similar section taken substantially on line 15—15 of Fig. 11, Fig. 16 is a perspective view of a hand tool used through the exit door to move the clamps along the discharge trackway to the exit door, and to transfer "O-ring" test samples from their conveyor to the holding members which carry them during testing, and Fig. 17 is a front view of a full size "dumbbell" test strip of natural or synthetic rubber, so-called because of its similarity in shape to a section taken through a dumbbell.

This high temperature test equipment is built around a modified standard room temperature testing machine known as an L-6 Scott Tester, obtainable from Scott Testers, Inc., Providence, Rhode Island, that has a compensating head for test strip gauges ranging from 0.040 in. to 0.130 in., a two speed autographic recorder, dual capacity of 175 lbs. and 300 lbs., and jaw separation rates of 1, 2, 10, 12, and 20 inches per minute.

The said standard machine has been substantially modified and materially improved upon in order to provide the apparatus disclosed and claimed herein. Among the improvements is the enclosing of the upper and lower clamps and the entire normal axis of extension of the elastomer sample under test within a heavily insulated compartment.

Among the features of the insulated compartment are: a heating section with temperature regulation; a fan system for circulating the heated air uniformly throughout the test zone; small entrance and exit ports for insertion and removal of the test strips; a track and conveyor mechanism for moving test strips and clamps into the test position; a second track for carrying the clamps and tested strips to the exit port; and a large main door. The main door, having a large glass window area, enables direct observation of the specimen being tested, but it need not be opened during operation of the machine, so that rapid loss of heat at high temperatures through this door is avoided.

Referring to Figs. 1 to 4 of the drawings, the numeral 20, designates in its entirety, a generally rectangular, heated and insulated compartment in which testing takes place. The compartment 20 is formed with interior and exterior framework 21 and 22 of angle-iron construction. The walls of compartment 20 are constructed of two layers of Thermobestos insulation 25 sandwiched between an inner layer of Transite insulation 26 and an outer layer of Marinite insulation 27, while in addition, aluminum foil reflective insulation 28, on the order of 0.002 of an inch in thickness, is placed between the three interior interfaces as indicated more clearly in Fig. 3a, wherein the insulation arrangement is exaggerated for the purpose of emphasis. Transite and Marinite are relatively hard-surface insulation boards, the former being composed of asbestos and Portland cement, while the latter is composed of asbestos fiber in an inorganic binder, and Thermobestos is a soft insulation block composed of hydrous calcium silicate and asbestos. All three are available from Johns-Manville Co. The front of compartment 20 is supported on legs 30 (one of which is shown in Fig. 1) that are suitably secured to the floor or other foundation 31, while the back of the compartment is bolted to a steel plate 32 (Figs. 3 and 4), which is bolted to a pair of spaced, vertical channel beams 33, which in turn are bolted to a large vertical channel beam 34 that extends from a base plate 35, secured to floor 31, to an upper plate 36 secured to the ceiling or upper supporting member 37.

The front wall of the compartment 20 has a relatively large main door 40 mounted therein, which is hinged as at 41 on one side and has latches 42 on the other side. Around the top, bottom and sides of the door 40, blocks of insulation material, such as Marinite, are suitably secured, and the rectangular front block 44 has a rectangular metal frame 45 secured thereto and carrying the hinges 41 and latches 42. Two of the insulation blocks, indicated at 46, extend from block 44 to the rear of the door, and blocks 46 carry a plurality (five in this instance) of spaced, transparent glass panes 47 which allow observation of the tests being conducted in compartment 20 with the door closed. The panes 47 are of tempered glass about one quarter inch in thickness and each is separated by an air gap of about one-quarter inch. Adjacent its outer edges, the rear face of block 44 carries insulation 50, such as Thermobestos, which makes sealing engagement with the outer surface of the Marinite layer 27 in the front wall, when the door 40 is closed, as indicated in Figs. 3, 4 and 5. The rear rectangular block 51 of the door is smaller than the front block 44 and fits within the doorway formed in the front wall of the test compartment. Insulation 52, similar to insulation 50, is carried on the rear face of block 51 and makes sealing engagement, when door 40 is closed, with a rectangular angle-iron door frame member 53 which is secured at the inner end of the opening forming the doorway in the front wall of compartment 20.

On the left side of compartment 20 at the top, a small lateral extension 55 is formed, which encloses a loading region 56 (Figs. 2 and 3) for test clamps and for test samples that are to be tested in the compartment. Loading area 56 communicates with the interior of compartment 20 through an opening 57 in the side wall, and loading takes place through a small port 58 which is normally closed by a small door, indicated in its entirety by the numeral 60, one side of said door being hinged as at 61 for swinging movement, while the other side carries a latch handle 62 that engages a latch 63 on the compartment wall, to hold the door closed. Door 60 is also heavily insulated, being formed generally rectangular of front and rear Marinite panels 64 and 65, and Marinite side panels 66, while the space between the panels is filled with Thermobestos 67. Extension 55 is generally rectangular and is heavily insulated with inner and outer Marinite panels 68 and 69, and Thermobestos 70 between the panels. The rear face of door panel 65 carries an insulation strip 71 which makes sealing engagement around port 58 when door 60 is closed.

On the right side of compartment 20, opposite loading region 56, the compartment wall is provided with a small opening or port 75 through which the carrying clamps and tested samples may be removed from the compartment. Normally closing port 75 is a small, heavily insulated door, indicated in its entirety by the numeral 76, which is hinged at its rear to the compartment wall, as at 77, while its front face carries a latch handle 78 that cooperates with a latch 79 projecting from the compartment side wall. Door 76 comprises front and rear panels 80 and 81, bottom and top panels 80' and 81' and inner and outer side panels 82 and 83, all of Marinite, while the space between these panels is filled with Thermobestos 84. The inner face of door panel 82 carries an insulation strip 85 which makes sealing engagement with the compartment wall around port 75 when door 76 is closed.

For about three-fourths of its height, compartment 20 is divided into a relatively large central region 88 and side regions 89 which are separated from region 88 by vertical, Marinite partitions 90. The upper end of region 88 communicates with a large area 91, which will be referred to as the testing region, and which extends from the entrance to the exit side of compartment 20. The upper ends of side regions 89 are separated from the testing region 91 by perforated baffle plates 92, secured between the upper ends of partitions 90 and the side walls of compartment 20.

In the lower central portion of each partition 90, a fan housing 95 is suitably secured, and each housing contains a fan 96 secured adjacent the inner end of a shaft 97 for rotation therewith. Each shaft 97 extends through the adjacent side wall of compartment 20 and is journaled for rotation in bearing brackets 98 bolted to a supporting shelf 99 which is suitably secured to the side walls of compartment 20. Rearwardly of each shelf 99, another shelf 100 is secured to the compartment walls, and the latter shelves each support an electric motor 101. The shaft 102 of each motor carries a large driving V-pulley 103 on its outer end, which receives a driving V-belt 104 that also passes around a small driven V-pulley 105 secured on the outer end of each shaft 97. Thus, motors 101 will drive fans 96 upon closing of switches 106 and 107 (Fig. 1), which are conventionally hooked up to furnish electric current to the motors.

In each side region 89 of compartment 20, a bank of strip heaters 110 is suitably secured above fans 96, and each bank contains both constant and intermittent conventional heaters bolted onto aluminum plates to provide more uniform radiation. In this instance, each bank 110 contains six 500-watt heaters and one 250-watt heater which operate from a conventional 208-volt 3-phase line (not shown). In use, each heater on one bank is paired with a heater on the opposite bank so that each of five switches 112, located in switch box 113 (Fig. 1) carried on the right side of compartment 20, controls 1000 watts of continuous heat, one switch 114 controls 250 watts of continuous heat from each bank, and one switch 115 in series with a Chromalox thermoregulator, a portion of which is shown at 116, outside compartment 20, obtainable from the Partlow Corporation, controls 1000 watts of intermittent heat. The present thermoregulator is designed to limit the operating temperature to a maximum of 650° F.; however, the compartment has been heated to 1000° F. and could be controlled at temperatures above 650° F. by installing a thermoregulator designed for a higher temperature range.

With the fans 96 in operation at the bottom of the compartment 20, air is pulled down the side regions 89 of the compartment past the banks of heaters and then is pushed upward into central region 88 and the test region 91, the air generally following the path indicated by the arrows in Fig. 2.

Mounted in the test region 91 is a conveyor arrangement, indicated in its entirety by the numeral 118. This conveyor includes an incoming section for carrying test samples and the clamps holding them from the loading region 56 to the testing location, and an outgoing section for thereafter carrying the clamps and tested samples to the exit door 76.

The incoming section of the conveyor comprises spaced upper and lower vertically aligned L-shaped guide rails 120 and 121, while the outgoing section comprises similar rails 122 and 123, which are horizontally aligned with rails 120 and 121. Rails 120 and 121 are suitably bolted to angle brackets 125 and 126, which are bolted to a horizontal supporting bar 127 that is bolted to a pair of spaced, vertical channel beams 128, which in turn are bolted to a rear supporting plate 129 that is secured to the rear wall of compartment 20 by elongated bolts 130 that extend completely through said rear wall. Rails 122 and 123 are suitably bolted to angle brackets 131 and 132 which are carried by bar 127. The inner ends of rails 120, 121 and 122, 123 are spaced apart to provide a testing space 135 in which the holding clamps and test samples are arranged while the tests are being conducted. Lower rail 121 is longer than rail 120 and has a vertical, arcuate slot 137 therein near its outer end, while rails 122 and 123 have oppositely disposed arcuate slots 138 and 139 therein near their inner ends. The purpose of these slots will be referred to later.

Referring to Figs. 2, 6 and 8, the type of holding clamps are shown therein which are used with dumbbell strip test samples, and the upper clamps are designated in their entireties by the numeral 140, while the lower clamps are similarly designated 141. Each clamp 140 and 141 comprises a body portion 142 that includes spaced side walls between which a knurled roller 143 is eccentrically mounted, and each roller has a spring pulled pin 144 extending therefrom. Clamp 141 is in reversed position with respect to clamp 140 and the rollers 143 in each clamp are oppositely disposed so that each roller has a normal tendency to be urged toward the rear wall 145 (Fig. 8) of each clamp to hold a sample test strip, such as the dumbbell strip 146 (Figs. 8 and 17), between the clamps. Carried by each clamp in spaced relation to the rear wall 145 thereof is an angular guide plate 147 which hooks over the guide rails 120, 121, when the clamps are on the incoming section of the conveyor, and over guide rails 122, 123 when the clamps are on the outgoing section of the conveyor, permitting the clamps to be moved along the guide rails. From the top of each clamp 140 and from the bottom of each clamp 141, an internally threaded socket 150 extends, and each socket adjustably receives the inner threaded end of a stem 151, the outer end of which carries a generally keystone shaped centering member 152, which is utilized to lock the clamps in the testing position and to center them in proper alignment, as will be explained later.

A continuous conveyor chain 155 is provided to move the clamps along the incoming section of the conveyor. As more clearly shown in Figs. 2, 3 and 6, chain 155 operates in the space between guide rails 120, 121, passes around an idler sprocket 156 suitably mounted for rotation on a vertical shaft 157 carried in angle bracket 132, and around a driven sprocket 158 fixed on a vertical driven shaft 159, the upper portion of which is suitably journaled in angle bracket 125. Shaft 159 passes through the lower wall of extension 55 and its lower end is journaled in a bearing bracket 160 (Fig. 2) suitably secured to the adjacent side wall of compartment 20. A hand wheel 161 (Fig. 1) is operatively connected through horizontal shaft 162 and conventional gearing to the lower end of shaft 159, whereby when wheel 161 is rotated (manually in this instance), chain 155 will be driven. At spaced intervals around chain 155, a plurality of horizontally extending fingers 165 (Fig. 3) are suitably secured, and a vertical pusher arm 166 is carried on the outer end of each finger 165.

In use, in the loading region 56, clamps 140 and 141 with a test strip held between them, are placed on the guide rails 120 and 121, between two of the pusher arms 166. Rotation of hand wheel 161 will move chain 155, and an adjacent pusher arm 166 will move the set of clamps and test strip along the rails to the testing space 135. As many sets of clamps and test strips may be mounted in the loading region as are required in accordance with the preheating time selected for the material being tested, since only one strip at a time is in the test space and any other test strips on the conveyor will, of course, be preheated. This preheating will be more fully discussed later. After the test strip is broken, the chain is again moved and the pusher arms 166 push the clamps 140 and 141 onto guide rails 122 and 123 of the outgoing section of the conveyor, after which the pusher arms pass through slots 138 and 139 in the latter guide rails and eventually return to the starting end of the conveyor. At the starting end, the pusher arms pass around the outer end of upper rail 120 and through slot 137 in the lower rail 121. Thus the pusher arms are able to make a complete cycle during which they first move the clamps and test strips into the testing space and thereafter onto rails 122, 123. After the clamps are on the rails 122, 123, they are manually moved along these rails to the exit door by means of an elongated hand rod 168 (Fig. 16), which is extended by an operator through the exit port to pull the clamps to the exit door, where they are removed and made ready for use again.

Above the testing space 135 a centering block 170 (Figs. 2, 6 and 8) is adjustably carried on the lower threaded end of an operating rod 171, being held thereon by nuts 172. Block 170 has a tapered passage 173 in its lower face, which passage receives, but is larger than, the tapered keystone member 152 carried by upper clamp 140. Below the testing space 135 is a second centering block 170', similar to block 170 except that its position is reversed, adjustably carried on the upper threaded end of an operating rod 174, being held thereon by nuts 172'. Block 170' has a tapered passage 173' in its upper face, similar to the passage 173, which passage receives, but is also larger than, the tapered keystone member 152 carried by lower clamp 141.

When the blocks 170 and 170' are in their initial positions, they are in proper horizontal alignment with the keystone members 152 of the clamps, so that as a pusher arm 166 pushes a set of clamps holding a test strip into the testing space 135, the keystone members enter the passages 173 and 173' and come to rest therein, thus providing support for the clamps after they leave the guide rails 120, 121. Passages 173 and 173' are made larger than members 152 so the latter can readily enter the passages. This provides a loose fit to start, but as soon as a force is applied to move the lower clamp downwardly, which will be referred to later, the members 152 become tightly locked in the centering blocks, due to the tapering passages in the latter and the tapering sides on members 152. Thus the clamps are locked in proper position and are prevented from any turning, or backward or forward movement.

Cooperating with the operating rod 174 is standard

Scott Tester equipment for applying a force to separate the clamps or jaws 140 and 141 to stretch the test strip, and cooperating with rod 171 there is also standard Scott Tester equipment for indicating and recording the results of the tests. None of this standard equipment forms a part of the present invention, except in combination with the novel parts disclosed herein, and hence only a brief reference will be made thereto, sufficiently to understand the operation of the apparatus.

Referring first to the equipment cooperating with rod 174, and Figs. 2 and 4, the lower end of this rod is suitably connected to a vertically movable T-shaped arm 177 at the junction of main branch 178 of the arm with the cross branch 179. The rear end of the main branch 178 is suitably secured to or formed integral with a sleeve 180 that surrounds and is slidable on a tubular supporting member 181 which is fixed in vertical position in compartment 20 by bolts and nuts 182 between the channel beams 128. The ends of cross branch 179 of arm 177 carry small sleeves 183 that are slidingly received on vertical supporting rods 184. The upper ends of rods 184 carry stop members 185 and are secured by angle brackets 186 to channel beams 128, while the lower ends of these rods carry stop members 187 and are secured to similar brackets 188. Thus vertical movement of the arm 177 is confined between stop members 185 and 187.

Vertical movement of arm 177 and lower clamp 141 is accomplished by means of a chain 190, the upper end of which is suitably secured to arm 177 and this chain extends downwardly through a sleeve 191 (Fig. 2) fixed in the bottom wall of compartment 20, into a gear box 192 (Fig. 1). Box 192 contains conventional gearing (not shown) for moving chain 190 downwardly at selected speeds, which gearing is driven from an electric motor 193 controlled by a foot-operated switch 194. From a driven gear in box 192, chain 190 passes under compartment 20, around suitable idler sprockets (not shown) and into the lower end of a vertical supporting tube 197 (Fig. 4) which is fixed between channel beams 33 by means of bolts and nuts 198. In tube 197, the lower end of chain 190 is suitably secured to the lower end of a movable counterweight 197' (Fig. 4). To the upper end of counterweight 197', one end of a second chain 199 (Fig. 4) is suitably secured, and this chain passes over suitable sprockets (not shown), over the top of compartment 20 and downwardly through the top wall of the compartment to arm 177 where it is suitably connected to main branch 178 of the arm, substantially at the place indicated at 199' (Fig. 4).

The mechanism described for controlling movement of arm 177 is generally similar to and involves the same principle of operation as the mechanism shown in U.S. Patents Nos. 1,659,675 and 1,749,991 except that as a matter of expediency, the counterweight 197' between the two chains 190 and 199 in the present apparatus is located in tube 197 outside compartment 20 instead of in tube 181, so that this counterweight will not be affected by the heat in the compartment. In use, as arm 177 moves downwardly by the action of motor 193, the counterweight 197' will be pulled upwardly. Then when arm 177 has completed its downward movement, for example when a test strip held between the clamps 140 and 141 has been stretched until it breaks, foot switch 194 is opened to stop the motor, and means (not shown) inside gear box 192 operated by switch 194, breaks the driving connection between chain 190 and its driving gear, so that the counterweight 197' will fall by gravity and quickly pull arm 177 back to its initial position. A snubbing arrangement (not shown) is provided to snub the falling action of the counterweight and prevent damage to the equipment. For more detailed information concerning the mechanism for controlling movement of arm 177 reference may be had to the aforementioned two patents.

In some instances it has been found desirable to use additional counterweights to more quickly return arm 177 to its initial position. As shown in Figs. 2 and 4, the sleeves 183 are provided with lateral extensions 200, to each of which, one end of a cable 201 is secured. Each cable 201 extends upwardly through the top of compartment 20, over suitable pulleys (not shown), and down the back of the compartment to relatively small counterweights 201'.

Referring now to the equipment cooperating with rod 171 and Figs. 1 and 2, this rod extends upwardly through a sleeve 202 (Fig. 2) suitably fixed in the top wall of compartment 20, and through a guide sleeve 204 mounted on top of the compartment. The upper end of rod 171 is connected to one end of a chain 206 that engages a gear 208 pivotally mounted on a shaft 210 which carries a pointer 211 movable over the face of a graduated dial 212 to indicate visibly in pounds or other unit of measure the pull being exerted on the test strip held between the clamps 140 and 141, during the testing operation. To gear 208 is connected the upper end of a graduated depending weight arm 213, carrying a weight 214 adjustably mounted thereon to be retained in adjusted position by a set screw 215. Weight arm 213 is provided with a pivoted pawl 216 in engagement with the teeth of a curved rack 217. Connected to the pawl is one end of a releasing cable 218 that passes over a pulley 219 on the upper end of rack 217, and then around pulleys 220 and 221 on top of compartment 20, from which point this cable extends downwardly in front of the compartment on the right side and terminates in a handle 222. If only a visible reading of the position of pointer 211 is to be taken at selected times during testing of the sample strip, this may be done while the weight arm 213 is progressively moving up rack 217 and being held at each new position by the pawl engaging the rack teeth. After the test strip is broken, the final position of the pointer 211 is noted, and the pawl is then tripped by pulling cable 218, allowing the weight arm 213 to return by gravity to its initial position.

When it is desired to automatically record the behavior of the sample strip being tested, suitable autographic equipment is provided, wherein an electricacl conducting, vertically movable plate 225 is supported on top of compartment 20 and carries a chart 226 thereon. Mounted in suitable guides on plate 225 and insulated therefrom is a guide rod 228 on which is slidably mounted a spark pointer 229 and this pointer is connected at 230 to one end of a rod 231, the opposite end of which is connected to weight 214. A conventional electric circuit (not shown) is provided whereby when a switch button 233 (Fig. 1) on the front of compartment 20 is pushed by an operator a spark is produced at the end of pointer 229 of sufficient force to puncture the chart 226. The chart is punctured at selected intervals as will be referred to later.

The mechanism described which cooperates with rod 171 for indicating and recording the results of tests is generally similar to and involves the same principle of operation as the mechanisms shown in U.S. Patent No. 1,679,751, and for more detailed information concerning same, reference may be had to this patent.

Hanging vertically in compartment 20 adjacent the sample strip to be tested, is a calibrated measuring rod 235 (Figs. 2 and 2a), the upper end of which is secured to one end of a cable 236 that extends upwardly through the upper wall of compartment 20 and across the top of the latter over pulleys 238 and 239 (Fig. 1) and its opposite end carries a counterweight 240. The edge of rod 235 next to the testing strip is marked with pointed projections a uniform distance apart, for example, one inch, and these projections are designated in descending order 235a, 235b, etc. (Figs. 2 and 2a).

Rod 235 has an elongated longitudinal slot 335 therein which receives a projection 336 of a spacer 337 suitably secured to arm 177. This projection is of greater length than the thickness of rod 235, and a screw 338 extends through slot 335 into spacer 337, with a washer 339 being interposed between the screw head and the outer surface of projection 336. This arrangement permits free relative movement between arm 177 and rod 235, yet permits an operator to make the necessary adjustment of rod 235 from outside compartment 20, in accordance with movement of the sample strip, as later referred to.

At the beginning of a tensile or elongation test, a set of clamps 140 and 141 with a dumbbell strip 146 held between them is moved into the testing space 135, as previously described. Marked on the strip 146 are two lines 242 and 243 (Fig. 17) spaced apart the same distance as the projections on rod 235. At the start of the test, lines 242 and 243 are aligned horizontally with projections 235a and 235b, respectively, of rod 235. When a force is applied to separate the clamps by pulling clamp 141 downwardly as previously described, the strip 146 will stretch. With projection 235a of rod 235 maintained in alignment with top line 242 on the test strip, when line 243 reaches projection 235c the elongation of the test strip between the marked lines will be 100%, at projection 235d the elongation will be 200%, at 235e, 300%, etc., until at some point the test strip will break. As each point of 100%, 200%, 300%, etc., elongation, as well as the breaking point, is reached, the operator pushes switch button 233 and spark pointer 229 punctures chart 226 of the autographic equipment to automatically record information desired from the test, such as the p.s.i. at any given elongation. As each point of elongation and breaking is reached, the operator can manually record the force in p.s.i. indicated on dial 212 at each point, which is required to elongate the test strip. During stretching of test strip 146 there will be some downward movement of the upper line 242, and in order for the operator to keep projection 235a of rod 235 in proper alignment with line 242, so that the test results will be accurate, he must manually lift cable 236 above or by the counterweight 240, so that rod 235 may move downwardly by gravity to allow projection 235a to again become properly aligned with line 242 on the test strip.

In Figs. 7, 9 and 10, we have shown a different type of clamp for use with test strips when adhesion tests are to be made. In these figures the numerals 250 and 251 designate as a whole, upper and lower adhesion strip clamps. Each of these clamps has a flat body portion 252 that terminates at one end in a toothed extension 253. Intermediate each body portion 252, a bolt 254 is suitably secured and extends outwardly to receive a generally L-shaped clamping plate 255 that is held thereon by a wing nut 256. The lower end of upper plate 255 and the upper end of lower plate 255 are each provided with a short toothed extension 257 which faces extensions 253 on the clamp body, so that a test sample 259 may be tightly clamped between the toothed surfaces of the respective clamps. In this instance, the test sample 259 comprises a layer of fabric 260 bonded or vulcanized to a layer of rubber 261 (natural or synthetic). One end of the fabric is held between the teeth of the upper clamp and one end of the rubber is similarly held in the lower clamp. Guide plates 265 are bolted to each clamp 250 and 251 to permit the clamps to be mounted on the conveyor rails, so that these clamps and test samples may also be moved along the incoming section of the conveyor into the testing space 135 by pusher rods 166, and thereafter onto the rails of the outgoing section of the conveyor. While in the testing space 135, clamps 250 and 251 are aligned and locked against rotation and forward and backward movement in the same manner as clamps 140 and 141. The test in this instance consists of pulling the lower clamp 251 downwardly to determine the force required to separate the rubber and fabric, which force will be indicated on dial 212, or on the autographic equipment, if desired.

In Figs. 11 to 15, inclusive, we have shown supplemental mechanism for use when O-rings are to be tested in the compartment 20. As shown, numeral 270 designates a carrying plate for an endless chain 271, and this plate has suitably secured thereto adjacent each end, a generally S-shaped supporting bracket 272, the upper ends of which hook over the top of rail 120, as indicated in Fig. 13, to support chain 271 in a vertical position between the loading region and the testing space in compartment 20. Chain 271 passes around an idler sprocket 273 suitably mounted for rotation in a bearing 274 carried on plate 270 adjacent the inner end thereof, and around a driven sprocket 275 suitably mounted in a bearing 276 carried on plate 270 near the outer end thereof. As more clearly shown in Figs. 13 and 15, shaft 277 for sprocket 275 extends forwardly of the sprocket to receive an annular knurled driving knob 278 which fits over the end of this shaft and has a small offset opening 279 that fits over a pin 280 (Figs. 11 and 15) projecting from sprocket 275. When the knob 278 is engaged with shaft 277 and pin 280, manual turning of the knob will drive chain 271. At spaced intervals on chain 271, generally T-shaped projections 281 are suitably secured to the chain and these projections receive O-rings 282 (Figs. 11 and 13) of natural or synthetic rubber, and carry these rings from the loading region to the testing space 135 where they are removed from the pins by an operator using the hand rod 168 through the exit door and looping the rings over upper and lower receiving members therefor, indicated in their entireties by the numerals 285 and 286 respectively.

The upper receiving member 285 comprises a body 287 having a forwardly extending roller 288 suitably mounted adjacent the lower end thereof. Extending upwardly from body 287 is an adjustable threaded rod 289, similar to rod 151, that carries one of the keystone members 152 on its upper end for engagement in the upper centering block 170 in the same manner previously described in connection with clamps 140 and 250, except that a small screw 290 is used to insure holding the block 170 and keystone member 152 in proper position.

The lower receiving member 286 also has a body 287 and an adjustable rod 289 extending from the lower end thereof that carries a keystone member 152 for engagement in the lower centering block 170', and again a screw 290 is used to properly position these members. However, the roller 291 mounted in the upper end of member 286 is driven. As shown, shaft 292 of roller 291 carries a small gear 293 on its rear end, which gear meshes with the teeth of a vertical rack 294 bolted to the inner end of guide rail 121. Rack 294 in this instance is only put in position when the supplemental O-ring mechanism is to be used, but a permanent rack could be installed, if desired, so as not to interfere with the movement of the clamps on the conveyor sections. Thus, as the lower receiving member moves downwardly to stretch an O-ring 282, the roller 291 is continuously rotated so that the tension on each side of the O-ring is always equal during the test.

In order to determine the amount of stretch of the O-rings, a calibrated measuring rod 295 has its upper end secured to a flange 296 carried by the upper receiving member 285, and this rod extends downwardly through a guide 297 secured on a flange 298 carried by the lower receiving member 286. Rod 295 has a line 299 thereon which is in alignment with the center of upper roller 288, and the guide 297 constitutes in effect a second line which is always in alignment with the center of lower roller 291. Thus, as the O-ring stretches, the movement of guide 297 down the rod 295 indicates the amount of elongation.

When O-rings are to be tested, only one set of receiving members 285 and 286 is used, and these are temporarily locked in the testing space by the operator. Thereafter the delivery of O-rings from the inlet port to the receiving members is accomplished by moving chain 271 in substantially the same manner, chain 155 is used to deliver other test specimens to the testing region.

It will be observed that in the operation of the apparatus, use of the small entrance and exit ports at the sides of compartment 20 enables movement of test specimens into test position without opening the main door 40. This eliminates most of the heat loss which would result from loading and unloading through the main door, and in addition, the operator is not exposed to the heated air and the heat radiation which would escape through the main door if it were opened while operating at elevated temperatures.

Compartment 20 can be brought from room temperature to an operating temperature of about 550° F. in approximately one hour by application of all heaters (6500 watts). Once this temperature is reached and actual operation of the apparatus begins, only about 1600 watts are required to maintain the test temperature. The surface temperature of the outer Marinite and metal framework when operating at 550° F. is but about 100° to 110° F., depending on the location but the temperature outside the main glass door 40 will reach about 185° F. At any given time the maximum temperature difference among different locations in compartment 20 was found to be about 3.7° F. At a given locus in the test zone the temperature variation due to cycling, as the intermittent heater went off, was about ±0° F. The maximum temperature loss due to opening the side doors for loading and unloading was about 10° F., the unloading having the greater effect, and this loss is recovered within thirty seconds after the respective door is closed. Temperature accuracy of the apparatus during routine operation with regular loading and unloading procedures ranged from ±3° F. at about 200° F. to ±4.25° F. at about 550° F.

Testing at elevated temperatures obviously will be more time consuming than identical operations carried out at room temperature. Thus, in moving test specimens along the incoming section of the conveyor from the entrance port the specimens heat up to the test temperature and this movement to the test area must be carefully controlled timewise so that all specimens will have the same pretest treatment. It has been determined that maintaining a schedule of about four minutes between tests provides ample heating time for the specimens for all normal test operations. After a sample is tested, the clamps are removed from the test chamber along the outgoing section of the conveyor, the broken test strip is removed, the clamps are placed on the rails at the loading end of the conveyor, and a new strip is placed in the clamps, all within the four minute interval.

In order to prevent surface oxidation of steel parts of the clamps and conveyor rails, which oxidation would greatly increase friction of sliding and rolling components, a graphite film was used. This film or lubricant is known as "dgf 123" colloidal graphite, is applied by spraying the dispersion in a pressurized dispenser can, and can be obtained from A.P. Parts Corp., Toledo, Ohio.

The test chamber preferably is allowed to cycle at the desired temperature for a minimum of one-half hour before loading of samples is begun. Two minutes are allowed for elongating the strip to rupture, recording elongation, unloading the clamps containing the broken strips, and loading the first strip of a new cycle. One minute then is allowed for setting the adjustable counterweight 214 to the guage of the strip to be tested and returning the arm 213 to zero. All tension testing preferably is performed with a jaw or clamp separation speed of 20 inches per minute.

While we have illustrated and described the preferred form of our apparatus, it will be apparent that the invention is not limited thereto, and that changes and modifications may be made therein without departing from the spirit of the invention or from the scope of the subjoined claims.

What is claimed is:

1. A testing apparatus of the character described comprising a heat insulated compartment, means for supplying heat to said compartment at a temperature on the order of 550° F. and higher, means for delivering said heat to a testing region in said compartment, means for delivering a test sample of rubber and the like to said testing region, upper and lower holding members for holding said sample in said testing region, means for applying a downward force to separate said holding members with said sample opposing such separation, and mechanism to indicate the amount of force being applied to effect said separation, said apparatus being further characterized in that an incoming section of spaced conveyor guide rails is secured on one side of said testing region and an outgoing section of similar guide rails is secured on the opposite side of said testing region, said holding members with said test sample therebetween being mounted on said incoming guide rails at a location remote from said testing region, and being moved by said test sample delivery means to said testing region, aligning and centering means for said holding members in said testing region between said rail sections to receive said holding members, said delivery means being operable, after completion of the tests on said sample, to move said holding members out of said aligning and centering means onto said outgoing guide rails.

2. A testing apparatus of the character described comprising a heat insulated compartment, means for supplying heat to said compartment, means for delivering said heat to a testing region in said compartment, means for delivering a test sample of rubber and the like to said testing region, means for holding said sample in said testing region, means for applying a force to stretch said sample, and mechanism to indicate during the stretching of said sample the amount of force being applied, said apparatus being further characterized in that an incoming section of spaced conveyor guide rails is secured on one side of said testing region and an outgoing section of similar guide rails is secured on the oposite side of said testing region, said holding means comprising upper and lower clamps which hold said test sample therebetween, said clamps with said test sample therebetween being mounted on said incoming guide rails at a location remote from said testing region, and being moved by said test sample delivery means to said testing region, aligning and centering means for said clamps in said testing region between said rail sections to receive said clamps, said delivery means being operable after said test sample is broken to move said clamps out of said aligning and centering means onto said outgoing guide rails.

3. An apparatus for testing the tensile, elongation, tear and adhesion properties of natural and synthetic rubbers at high temperatures comprising a heat insulated compartment having a relatively large transparent main door, a relatively small inlet door on one side of said compartment and a similar outlet door on the opposite side of said compartment, means for supplying heat to said compartment at a temperature on the order of 550° F. and higher, means for directing said heat to a testing region in said compartment, conveyor means extending from said inlet door into said testing region, means for moving a test sample of said rubber by said conveyor means from said inlet door into said testing region, upper and lower holding members for holding said test sample in said testing region, means for applying a force to separate said holding members with said sample carried therebetween and opposing such separation, mechanism to indicate the amount of force being applied to said test sample, said conveyor means including a pair of spaced guide rails adapted to carry said holding members with said test sample therebetween, so that said holding members and test sample are simultaneously moved by said conveyor from said inlet door to said testing region, aligning and centering means for said holding members in said testing region to receive said holding members, a second pair of guide rails leading from said testing region to said outlet door, said means for moving said test sample and holding members being operable, after completion of the tests on said sample, to move said holding members out of said aligning and centering means onto said second pair of guide rails.

4. In a testing apparatus of the character described, a heat insulated compartment, electrical means for supplying heat to said compartment at a temperature on the order of 550° F. and higher, fans for delivering said heat to a testing region in said compartment, baffles for directing said heat to said testing region, upper and lower centering members in said testing region, upper and lower holding members for holding a test sample of rubber and the like therebetween, means for moving said holding members with a test sample held therebetween from a location remote from said testing region into engagement with said centering members to center said holding members and test sample in said testing region, means for thereafter applying a force to separate said holding members and stretch said test sample, and mechanism to indicate the amount of force being applied to stretch said sample, said centering members being provided with generally V-shaped passages therethrough and said holding members being provided with portions of generally keystone-shape in cross section to fit properly within said passages.

5. A testing apparatus comprising a heat insulated compartment containing a testing region, means for controlling the temperature within the testing region, upper and lower holding members for holding a test sample of rubber and the like therebetween, an incoming section of spaced conveyor guide rails secured on one side of said testing region and an outgoing section of similar guide rails secured on the opposite side of said testing region, said holding members being adapted to be mounted on said incoming guide rails for delivery with the test sample held therebetween to the testing region, aligning means for said holding members in the testing region between said rail sections, delivery means for moving said holding members and test sample from a location remote from the testing region into engagement with said aligning means to align the holding members and test sample in the testing region, means for applying a force to separate the holding members with said sample opposing such separation in the testing region, and mechanism to indicate the amount of force being so applied to the sample, said delivery means being operable, after completion of testing the sample, to move the holding members away from said aligning means and into engagement with said outgoing rail section for movement away from the testing region.

6. A testing apparatus defined in claim 5, wherein all test controls are located outside of the compartment.

7. A testing apparatus defined in claim 5, comprising a relatively large transparent main door, a relatively small sample inlet door located on one side of the compartment and a similar outlet door on the opposite side of the compartment.

8. A testing apparatus defined in claim 5, wherein the aligning means are provided with generally V-shaped passages therethrough, and the holding members are provided with portions of generally keystone-shape in cross section to fit properly within said passages.

9. A testing apparatus comprising a heat insulated compartment containing a testing region and a temperature controlling region, means located in said last-named region for controlling the temperature within the testing region, upper and lower holding members for holding a test sample of rubber and the like therebetween, an incoming section of spaced conveyor guide rails secured on one side of said testing region and an outgoing section of similar guide rails secured on the opposite side of said testing region, said holding members being adapted to be mounted on said incoming guide rails for delivery with the test sample held therebetween to the testing region, aligning means for said holding members in the testing region between said rail sections, delivery means for moving said holding members and test sample from a location remote from the testing region into engagement with said aligning means to align the holding members and test sample in the testing region, means for applying a force to separate the holding members with said sample opposing such separation in the testing region, and mechanism to indicate the amount of force being so applied to the sample, said delivery means being operable, after completion of testing the sample, to move the holding members away from said aligning means and into engagement with said outgoing rail section for movement away from the testing region.

10. A testing apparatus defined in claim 9, comprising a relatively large transparent main door, a relatively small sample inlet door located on one side of the compartment and a similar outlet door on the opposite side of the compartment.

11. A testing apparatus defined in claim 9, wherein the aligning means are provided with generally V-shaped passages therethrough, and the holding members are provided with portions of generally keystone-shape in cross section to fit properly within said passages.

References Cited in the file of this patent

UNITED STATES PATENTS

| | | |
|---|---|---|
| 2,375,034 | Semchyshen | May 1, 1945 |
| 2,404,584 | Liska et al. | July 23, 1946 |
| 2,510,952 | Brewster | June 13, 1950 |
| 2,709,359 | Koch et al. | May 31, 1955 |

UNITED STATES PATENT OFFICE

CERTIFICATION OF CORRECTION

Patent No. 2,904,993                           September 22, 1959

Frank S. Grover et al.

It is hereby certified that error appears in the above numbered patent requiring correction and that the said Letters Patent should read as corrected below.

Column 11, line 28, for "went off, was about $\pm 0°$ F." read -- went on and off, was about $\pm 3°$ F. --.

Signed and sealed this 29th day of August 1961.

(SEAL)
Attest:

ERNEST W. SWIDER
Attesting Officer

DAVID L. LADD
Commissioner of Patents